Feb. 19, 1935.   R. E. McNAMARA   1,991,813
DETACHABLE AUTOMOBILE RIM
Filed Aug. 8, 1932
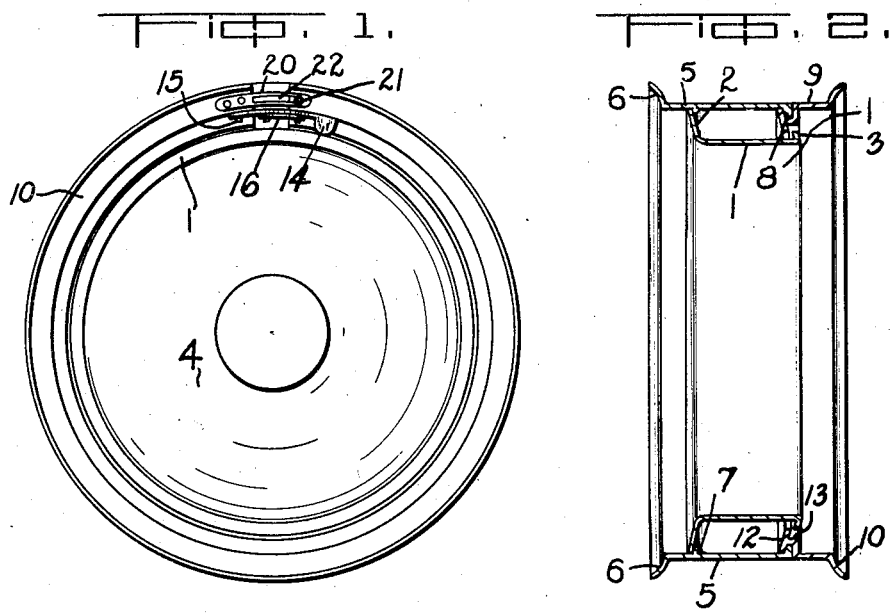
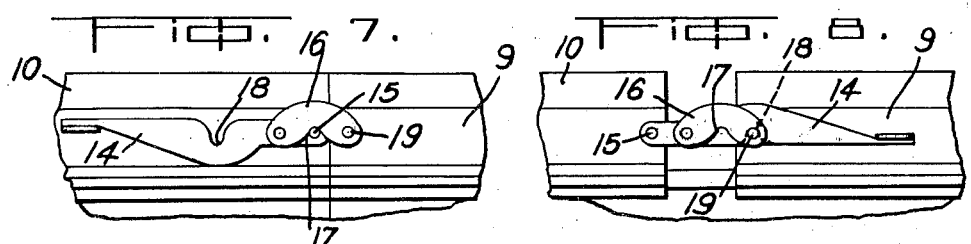
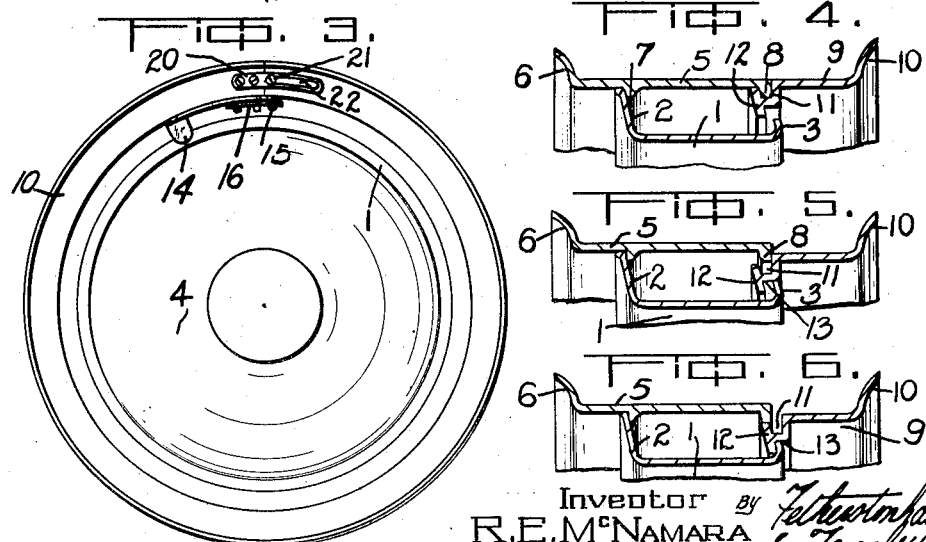
Inventor
R. E. McNamara Patented Feb. 19, 1935

1,991,813

UNITED STATES PATENT OFFICE 1,991,813

DETACHABLE AUTOMOBILE RIM

Russell Edward McNamara, St. Mary's, Ontario, Canada, assignor to The Wonder Motor Wheel Company Limited, St. Mary's, Ontario, Canada Application August 8, 1932, Serial No. 627,967

6 Claims. (Cl. 301—11)

My invention relates to improvements in detachable automobile rims and the object of the invention is to devise a rim which is held in the wheel felloe against movement relatively thereto by the pressure exerted by the tire on such rim.

A further object is to devise a simple and convenient device for actuating the detachable bead of the detachable or demountable rim into the expanded position wherein it is locked on the main portion of the rim and into the contracted position wherein it is released from the main portion of the rim in changing a deflated tire when the rim is not on the wheel or when it is desired that the complete rim shall be locked to the felloe when it is thereon.

With the above and other objects in view which will hereinafter appear, my invention consists in its preferred embodiment of the construction all as hereinafter more particularly described and illustrated in the accompanying drawing in which:—

Fig. 1 represents a side elevation of a wheel showing my rim applied to the wheel and in the position prior to locking such rim on the felloe of the wheel.

Fig. 2 is a vertical cross section therethrough.

Fig. 3 is a similar view to Fig. 1 showing the rim in the locked position on the felloe.

Fig. 4 is an enlarged fragmentary cross section showing the rim on the felloe in the same position as illustrated in Figs. 1 and 2.

Fig. 5 is a similar view to Fig. 4 showing the detachable bead contracted just prior to the tire pressure acting upon it.

Fig. 6 is a similar view to Fig. 5 wherein the detachable bead has been moved outwardly under the influence of the tire pressure so that it locks between the outer flange of the felloe and the inwardly directed outer flange of the main portion of the tire carrying rim.

Fig. 7 is an inverted fragmentary plan view of the locking member in the position it assumes when the split detachable bead is in the contracted position as illustrated in Fig. 3, and Fig. 8 is a similar view to Fig. 7 showing the locking member in such position that the split detachable bead is expanded in a position similar to that shown in Figs. 1 and 2.

Like characters of reference indicate corresponding parts in the different views.

The wheel felloe 1 is provided with an outwardly directed inner flange 2 and a similar outer flange 3, the inner flange 2 being deeper than the flange 3. The felloe is mounted on the usual wheel proper 4.

The demountable tire carrying rim is composed of a main portion 5 which is provided with the usual inner bead 6, and also with an internal circumferential rib 7 disposed adjacent to such bead and with an inwardly directed outer flange 8.

The detachable bead 9 is provided with the usual outer flange 10 and circumferential groove 11 in its external face adjacent to its inner edge which latter terminates in an inwardly and outwardly directed circumferential flange 12. A circumferential shoulder 13 is formed adjacent to the flange 12 on the internal face of the split detachable bead 9.

The locking member comprises a lever 14 pivoted to the internal face of the split bead 9 in the vicinity of one of its ends, the pivot pin 15 protruding beyond the surface of the lever, and a link 16 with a notch 17 disposed intermediately of the length of its bottom edge, said link being pivoted or otherwise secured at one end to the other end of the split bead 9 and its opposite end pivotally connected to the lever 14 between its pivot and a notch 18 disposed intermediately of the length of the lever.

The rim is actuated as follows:—Assuming that it is desired to replace a deflated tire the detachable bead 9 is contracted so that the external edge of the flange 12 can override the inwardly directed flange 8 of the main portion 5 by swinging the lever 14 into the position illustrated in Fig. 7 or Fig. 3. The bead 9 can then be detached and a new tire placed on the main portion 5 of the tire carrying rim, the bead 9 then being replaced and expanded by swinging the lever 14 into the position illustrated in Fig. 8 or Fig. 1. The tire can only be removed and replaced when the tire carrying rim is off the felloe. When the split bead 9 is expanded or contracted the main portion 5 and such bead are in the relative positions shown in Figs. 4 and 5 respectively with the exception that the tire carrying rim would not be on the felloe 1.

After placing the tire (not shown) on the tire carrying rim and expanding the split bead 9 as above described the tire is inflated and with the bead 9 still expanded wherein it is locked to the main portion 5 it is applied to the felloe 1 as illustrated in Fig. 4. By actuating the locking member as above described the bead 9 is then contracted into the position illustrated in Fig. 5 wherein it is disengaged from the main portion 5 allowing the tire pressure to act on the bead 9 and force it into the position illustrated in Fig. 6 wherein the internal portion of the flange 12 engages the inner face of the shorter outer flange 3 of the felloe 1 and the external portion of the flange 12 abuts the edge of the internally directed outer flange 8 of the main portion 5. The tire pressure holds the tire carrying rim against rotation relatively to the felloe no other means being required.

So long as the tire is inflated the tire carrying rim cannot be removed from the felloe but should the tire deflate the flange 12 bearing against the flange 3 of the felloe will prevent accidental displacement of the tire carrying rim from the felloe.

To remove the tire carrying rim with the deflated tire from the felloe it is now only necessary to expand the bead 9 as above into the position illustrated in Fig. 4 wherein the flange 12 will escape the flange 3 of the felloe when the tire carrying rim can be withdrawn.

In actuating the locking member to contract the bead 9 the pivot pin 15 enters the notch 17 in the link 16 but when the lever 14 is swung to expand the bead 9 the notch 18 engages the pivot pin 19 upon which the link 16 is mounted. Thus the lever is locked in either the position in which the bead 9 is expanded or contracted.

To prevent lateral distortion of the split bead 9 when detached a plate 20 is riveted or otherwise secured to one face of the bead 9 in the vicinity of an end thereof and slidably secured to the corresponding face of the other end through the medium of a pin 21 extending through the longitudinal slot 22 in the plate.

As many modifications may be made in the invention without departing from the spirit of the same and the scope of the claims the form shown is to be taken in an illustrative and not in a limiting sense.

My rim can with equal facility be used on the wheels of buses, trucks and other vehicles.

What I claim as my invention is:

1. The combination with a wheel felloe having an outwardly directed circumferential outer flange, of a tire carrying rim comprising a main portion with an inwardly directed circumferential outer flange, an expansible and contractible split bead having an outwardly directed circumferential inner flange adapted to interlock with the inwardly directed flange of the main portion and having an inclined face adapted to coact with an inclined face of the inwardly directed flange of the main portion, and an inwardly directed inner flange on the bead adapted to interlock with the outwardly directed flange on the felloe.

2. In a demountable automobile rim, the combination with a wheel felloe having substantially radially outwardly directed inside and outside flanges, the latter flange being of less height than the inside flange but extending appreciably beyond the transverse portion of the felloe, of a tire carrying rim including a main portion and means thereon for engaging the inside flange of the felloe, an expansible and contractible split bead and means thereon for interlocking it with the main portion of the tire carrying rim when it is expanded and alternatively interlocking it with the outside flanges of the felloe when it is contracted, said first mentioned interlocking means being disengaged when the latter interlocking means is operative whereby the bead is permitted movement laterally away from the main portion of the tire carrying rim to complete such latter interlocking.

3. In a demountable automobile rim, the combination with a wheel felloe having substantially radially outwardly directed inside and outside flanges, the latter flange being of less height than the inside flange but extending appreciably beyond the transverse portion of the felloe, of a tire carrying rim including a main portion and means thereon for engaging the inside flange of the felloe, said tire carrying rim having a substantially radially inwardly extending flange at its outside edge, an expansible and contractible split bead having inwardly and outwardly extending substantially radial flanges at its inside edge, the outer bead flange being adapted to interlock with the tire carrying rim flange when the bead is expanded and the inner bead flange being adapted to interlock with the outside felloe flange when the bead is contracted.

4. In an automobile rim as claimed in claim 3 wherein the outer bead flange abuts the tire carrying rim flange lateral edge to lateral edge when the bead is contracted and its inwardly directed flange is interlocked with the outside felloe flange.

5. In a demountable automobile rim, the combination with a felloe having a substantially radial outwardly directed outside flange, a tire carrying rim having a substantially radial inwardly directed outside flange, and an expansible and contractible split bead having inwardly and outwardly directed flanges adapted respectively to interlock with the felloe flange and to abut the tire carrying rim flange upon the bead being contracted.

6. In a demountable automobile rim, the combination with a wheel felloe, of a tire carrying rim including a main portion, an expansible and contractible split bead and means for alternatively locking the bead in the expanded and contracted positions, the tire carrying rim with an inflated tire thereon and its split bead expanded and locked to the main portion being adapted to be applied to the felloe; an inwardly directed circumferential flange on the main portion and an interlocking outwardly directed flange on the bead, said flanges have coacting inclined faces whereby upon the unlocking of the bead locking means the air pressure of the tire tending to force the bead laterally away from the main portion effects the radial contraction of the bead, an outwardly directed flange on the felloe and an inwardly directed flange on the bead adapted to interlock with the outwardly directed flange on the felloe for interlocking the tire carrying rim to the felloe, said outwardly directed flange on the bead abutting the inwardly directed flange on the main tire carrying rim portion edge to edge upon the tire carrying rim being interlocked with the felloe.

RUSSELL EDWARD McNAMARA.